United States Patent Office 2,819,285
Patented Jan. 7, 1958

2,819,285

QUATERNARY AMMONIUM SALTS

Guiliana C. Tesoro, Dobbs Ferry, N. Y., and Reginald L. Wakeman, Philadelphia, Pa., assignors to Onyx Oil and Chemical Company, Jersey City, N. J., a corporation of New Jersey No Drawing. Application April 5, 1957
Serial No. 650,815

6 Claims. (Cl. 260—313)

This invention relates to and has for its object the provision of a new class of quaternary ammonium compounds (and methods for their preparation). These compounds, all containing a pyrrolidine nucleus, are potent antiseptics or germicides and are also useful as surface active agents.

The compounds of this invention are of the general formula

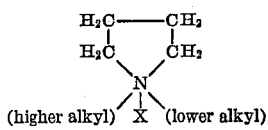

wherein X is an anion and the higher alkyl group is one having 14 to 18 carbon atoms.

Preferred are those compounds wherein X is halogen (especially chlorine or bromine) but other anions, such as sulfate, phosphate, methosulfate, nitrate, etc., are included within the purview of the invention. The terms "alkyl" and "higher alkyl," as used herein, are meant to include branched as well as straight chain radicals. Thus, "alkyl" may, inter alia, represent methyl, ethyl, isopropyl, butyl and hexyl, and "higher alkyl" may represent any of the radicals, such as tetradecyl and octadecyl.

Included among the compounds typical of the invention are tetradecyl methyl pyrrolidinium bromide (or chloride), cetyl methyl pyrrolidinium bromide (or chloride), octadecyl isopropyl pyrrolidinium chloride and tetradecyl ethyl pyrrolidinium phosphate.

These compounds may be prepared by (1) treating pyrrolidine with an alkyl halide to form an N-substituted pyrrolidine, then (2) treating the resulting product with an alkyl ester of an acid (preferably inorganic), provided that at least one of the alkyl substituents of the reactants used is higher alkyl. Reaction conditions, both for the preparation of the N-substituted pyrrolidine and the quaternary ammonium salt, may be varied widely. For example, proportions of reactants used are not critical (use of an excess of pyrrolidine for N-substitution is preferable, however) and, although it is generally desirable to use elevated temperatures in the quaternization step, lower temperatures may be used and reaction times extended proportionally. In the reactions, use of an inert organic solvent (e. g. an alcohol, benzene, toluene, n-hexane, and dioxane) is preferable although usually not necessary, especially in the quaternization step.

The compounds of the invention have unexpectedly been found to be far more effective as a germicide than even the corresponding adjacent homologs. For example, in the standard phenol coefficient test for determining germicidal activity described in U. S. Dept. of Agriculture Bull. N 198, the following test results were obtained.

|  | Phenol Coefficient at 20° C. | |
|---|---|---|
|  | S. Aureus | E. Typhosa |
| (a) Lauryl methyl pyrrolidinium bromide | 200 | 75 |
| (b) Tetradecyl methyl pyrrolidinium bromide | 675 | 310 |
| (c) Cetyl methyl pyrrolidinium bromide | 750 | 375 |

The test results show that the germicidal activity of lauryl methyl pyrrolidinium bromide is insignificantly low when compared with that of the homologous tetradecyl and cetyl compounds covered in the present invention.

The following examples are illustrative of, but in no manner to be construed as limiting, the invention.

EXAMPLE I

A. N-octadecyl pyrrolidine

A mixture of 300 g. octadecyl chloride, 214 g. pyrrolidine and 642 g. isopropanol is heated at 100° C. for 6 hours in a stainless steel bomb capable of withstanding pressures up to 50 lbs./sq. in. The reaction mixture is then cooled and the isopropanol and excess pyrrolidine are separated by distillation at atmospheric pressure. To the cooled residue is added, with stirring, 500 g. 5% aqueous sodium hydroxide solution. The organic layer is then separated, washed once with 50 ml. 10% aqueous sodium hydroxide solution, then vacuum distilled to obtain about 212 g. N-octadecyl pyrrolidine (B. P. 133–166° C./6 mm.; eq. wt.: Calcd. 256, found 256).

B. Octadecyl methyl pyrrolidinium bromide

A mixture of 13 g. N-octadecyl pyrrolidine and 40 g. 13% methyl bromide solution is isopropanol is heated to 65° C. and allowed to reflux gently for 3 hours with stirring. To the reaction mixture is then added 100 ml. water and, after distilling off the isopropanol, the mixture is further concentrated until a 30% aqueous solution (as indicated by bromide titration) of octadecyl methyl pyrrolidinium bromide is obtained. (This solution may, of course, be concentrated to dryness or used as such, if preferred.)

EXAMPLE II

A. N-(n-tetradecyl) pyrrolidine

Following the procedure of Example I–A except that a mixture of 130 g. n-tetradecyl chloride, 107 g. pyrrolidine and 321 g. isopropanol is substituted for the octadecyl chloride, pyrrolidine, isopropanol mixture of the reference example, about 113 g. N-(n-tetradecyl) pyrrolidine is obtained (B. P. 153–181° C./5 mm.; eq. wt.: Calcd. 295, found 317).

B. n-Tetradecyl methyl pyrrolidinium bromide

Following the procedure of Example I–B except that N-(n-tetradecyl) pyrrolidine is substituted for the N-octadecyl pyrrolidine of the reference example, n-tetradecyl methyl pyrrolidinium bromide is obtained.

EXAMPLE III

A. N-cetyl pyrrolidine

Following the procedure of Example I–A except that cetyl chloride is substituted for the octadecyl chloride of the reference example, N-cetyl pyrrolidine is obtained.

B. Cetyl methyl pyrrolidinium bromide

Following the procedure of Example I–B except that N-cetyl pyrrolidine is substituted for the N-octadecyl pyrrolidine of the reference example, cetyl methyl pyrrolidinium bromide is obtained.

EXAMPLE IV

A. *N-ethyl pyrrolidine*

218 g. ethyl bromide are added dropwise to a solution of 156 g. pyrrolidine in 200 g. methanol. The addition is carried out over a period of 8 hours at 40–50° C. The reaction is exothermic and no external heating is necessary. At the end of this period, titration of ionic bromide indicates that all of the ethyl bromide has reacted. 80 g. solid sodium hydroxide are then added gradually with stirring to the reaction mixture. Slowly, the amine is liberated from the amine hydrobromide and sodium bromide precipitates out. Upon filtering, a methanol solution of ethyl pyrrolidine is obtained. Separation of the product from the solvent by distillation is not feasible since ethyl pyrrolidine and methanol codistil under ordinary conditions. The solution may be used without further purification for the preparation of quaternary ammonium salts.

B. *Tetradecyl ethyl pyrrolidinium chloride*

Following the procedure of Example II–B except that equivalent amounts of N-ethyl pyrrolidine and tetradecyl chloride are substituted for the N-(n-tetradecyl) pyrrolidine and methyl bromide, respectively, of the reference example, tetradecyl ethyl pyrrolidinium chloride is obtained.

This invention may be variously otherwise embodied within the scope of the appended claims.

We claim:

1. A compound of the general formula

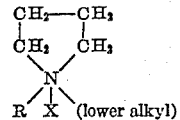

wherein X is an inorganic anion and R is a higher alkyl radical having 14 to 18 carbon atoms.

2. A compound of claim 1 wherein X is a halogen.
3. A compound of claim 1 wherein X is bromine.
4. A compound of claim 1 wherein X is chlorine.
5. n-Tetradecyl methyl pyrrolidinium bromide.
6. Cetyl methyl pyrrolidinium bromide.

References Cited in the file of this patent

UNITED STATES PATENTS

| | | |
|---|---|---|
| 2,152,047 | Hahl et al. | Mar. 28, 1939 |
| 2,592,191 | Ruddy | Apr. 8, 1952 |
| 2,748,143 | Erickson | May 29, 1956 |

FOREIGN PATENTS

| | | |
|---|---|---|
| 935,611 | France | Feb. 2, 1948 |
| 805,521 | Germany | May 21, 1951 |
| 627,139 | Great Britain | July 29, 1949 |